(12) United States Patent
Bortoli et al.

(10) Patent No.: US 9,188,105 B2
(45) Date of Patent: Nov. 17, 2015

(54) STRUT DRIVESHAFT FOR RAM AIR TURBINE

(75) Inventors: Stephen Michael Bortoli, Roscoe, IL (US); Dustin L. Kaap, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1186 days.

(21) Appl. No.: 13/089,754

(22) Filed: Apr. 19, 2011

(65) Prior Publication Data

US 2012/0269634 A1 Oct. 25, 2012

(51) Int. Cl.
*F03D 9/00* (2006.01)
*B64D 41/00* (2006.01)
*F16C 3/02* (2006.01)

(52) U.S. Cl.
CPC ........... *F03D 9/00* (2013.01); *B64D 41/007* (2013.01); *F05D 2220/34* (2013.01); *F16C 3/023* (2013.01); *Y02E 10/72* (2013.01); *Y10T 29/4932* (2015.01); *Y10T 29/49826* (2015.01)

(58) Field of Classification Search
CPC ....... F03D 9/00; F05D 2220/34; F01D 5/026; F01D 5/06; F01D 5/25
USPC ............ 415/104, 109, 111, 119, 124.2; 416/174, 500
See application file for complete search history.

(56) References Cited

U.S. PATENT DOCUMENTS

| | | |
|---|---|---|
| 2,017,609 A | 10/1935 | Sparrow |
| 2,583,369 A | 1/1952 | Gumagalli |
| 2,767,561 A | 10/1956 | Seeger |
| 2,967,572 A | 1/1961 | Breaux et al. |
| 2,970,652 A | 2/1961 | Breaux et al. |
| 2,986,218 A | 5/1961 | Wagner et al. |
| 2,986,219 A | 5/1961 | Boardman, Jr. et al. |
| 3,030,054 A | 4/1962 | Lee et al. |
| 3,149,678 A | 9/1964 | Chilman et al. |
| 3,379,893 A | 4/1968 | Cavanaugh |
| 3,469,633 A | 9/1969 | Avondoglio |

(Continued)

FOREIGN PATENT DOCUMENTS

| | | |
|---|---|---|
| CN | 101084370 A | 12/2007 |
| EP | 2077226 A2 | 7/2009 |

(Continued)

OTHER PUBLICATIONS

First Office Action from Chinese Patent Application U.S. Appl. No. 201210115708.2, dated Jul. 2, 2015, 21 pages.

*Primary Examiner* — Edward Look
*Assistant Examiner* — Christopher J Hargitt
(74) *Attorney, Agent, or Firm* — Kinney & Lange, P.A.

(57) ABSTRACT

A driveshaft for an aircraft ram air turbine includes a substantially cylindrical elongate portion, a first end extending from the elongate portion, and a second end extending from the elongate portion opposite the first end. The first and second ends each include a substantially frusto-conical section having a curved generatrix, such that distal portions of each of the first and second ends have smaller outer diameters than an outer diameter of the elongate portion. The elongate portion provides relatively high lateral stiffness and the first and second ends provide relatively low torsional stiffness, such that the driveshaft has a lateral natural frequency higher than an operating range of the driveshaft and has a torsional natural frequency below the operating range of the driveshaft.

21 Claims, 2 Drawing Sheets

(56) References Cited

U.S. PATENT DOCUMENTS

| | | | |
|---|---|---|---|
| 3,635,583 A | 1/1972 | Chilman et al. |
| 3,635,584 A | 1/1972 | Chilman et al. |
| 3,835,641 A | 9/1974 | Goodrich |
| 3,842,249 A | 10/1974 | Geyer et al. |
| 3,907,221 A | 9/1975 | Goodrich |
| 3,949,186 A * | 4/1976 | Nakayama et al. ...... 219/121.14 |
| 4,170,896 A | 10/1979 | Korkosz |
| 4,240,332 A | 12/1980 | Deutsch |
| 4,403,292 A | 9/1983 | Ejzak et al. |
| 4,411,596 A | 10/1983 | Chilman |
| 4,489,904 A | 12/1984 | Soederberg |
| 4,534,584 A | 8/1985 | Weirich et al. |
| 4,578,019 A | 3/1986 | Safarik |
| 4,661,734 A | 4/1987 | Capuano et al. |
| 4,663,819 A * | 5/1987 | Traylor ........................ 29/432 |
| 4,671,737 A | 6/1987 | Whitehouse |
| 4,676,548 A | 6/1987 | Cohen |
| 4,692,093 A | 9/1987 | Safarik |
| 4,701,104 A | 10/1987 | Cohen |
| 4,717,095 A | 1/1988 | Cohen et al. |
| 4,733,155 A | 3/1988 | Smith |
| 4,742,976 A | 5/1988 | Cohen |
| 4,743,163 A | 5/1988 | Markunas et al. |
| 4,797,590 A | 1/1989 | Raad et al. |
| 4,895,551 A | 1/1990 | Fritz |
| 4,905,134 A | 2/1990 | Recker et al. |
| 4,991,796 A | 2/1991 | Peters et al. |
| 5,068,591 A | 11/1991 | Hoegberg et al. |
| 5,096,734 A * | 3/1992 | Nikulainen et al. .............. 427/8 |
| 5,111,402 A | 5/1992 | Brooks et al. |
| 5,122,036 A | 6/1992 | Dickes et al. |
| 5,123,614 A | 6/1992 | Whitehouse |
| 5,145,324 A | 9/1992 | Dickes et al. |
| 5,174,719 A | 12/1992 | Walsh et al. |
| 5,191,254 A | 3/1993 | Raad et al. |
| 5,234,378 A | 8/1993 | Helgesen et al. |
| 5,249,924 A | 10/1993 | Brum |
| 5,257,907 A | 11/1993 | Seidel |
| 5,287,768 A | 2/1994 | Amborn et al. |
| 5,325,043 A | 6/1994 | Parro |
| 5,346,432 A | 9/1994 | Greulich et al. |
| 5,354,237 A | 10/1994 | Amborn et al. |
| 5,398,780 A | 3/1995 | Althof et al. |
| 5,484,120 A | 1/1996 | Blakeley et al. |
| 5,487,645 A | 1/1996 | Eccles |
| 5,505,587 A | 4/1996 | Ghetzler |
| 5,558,495 A | 9/1996 | Parker et al. |
| 5,562,417 A | 10/1996 | Grimm et al. |
| 5,564,903 A | 10/1996 | Eccles et al. |
| 5,685,694 A | 11/1997 | Jones et al. |
| 5,739,677 A | 4/1998 | Tsutsui et al. |
| 5,746,580 A | 5/1998 | Parker et al. |
| 5,779,446 A | 7/1998 | Althof et al. |
| 5,820,074 A | 10/1998 | Trommer et al. |
| 5,899,411 A | 5/1999 | Latos et al. |
| 5,904,317 A | 5/1999 | Elliott et al. |
| 5,988,982 A | 11/1999 | Clauer |
| 6,032,551 A | 3/2000 | Welsh et al. |
| 6,032,552 A | 3/2000 | Alleai |
| 6,127,758 A | 10/2000 | Murry et al. |
| 6,145,308 A | 11/2000 | Bueche et al. |
| 6,270,309 B1 | 8/2001 | Ghetzler et al. |
| 6,299,733 B1 * | 10/2001 | Graf et al. ..................... 162/272 |
| 6,331,099 B1 | 12/2001 | Eccles et al. |
| 6,503,056 B2 | 1/2003 | Eccles et al. |
| 6,555,929 B1 | 4/2003 | Eaton et al. |
| 6,580,179 B2 | 6/2003 | Eccles et al. |
| 6,666,108 B1 | 12/2003 | Alleai |
| 6,676,379 B2 | 1/2004 | Eccles et al. |
| 6,826,817 B1 | 12/2004 | Rapp |
| 6,846,158 B2 | 1/2005 | Hull |
| 6,886,346 B2 | 5/2005 | Sobieski et al. |
| 6,935,206 B2 | 8/2005 | Alleai |
| 6,981,302 B1 | 1/2006 | Breese et al. |
| 7,052,183 B2 | 5/2006 | Chen et al. |
| 7,059,136 B2 | 6/2006 | Coffinberry |
| 7,066,025 B1 | 6/2006 | Corbin |
| 7,074,010 B2 | 7/2006 | DeGroff et al. |
| 7,077,631 B2 | 7/2006 | Eccles et al. |
| 7,160,082 B2 * | 1/2007 | Allen et al. ................... 415/229 |
| 7,197,870 B2 | 4/2007 | Bannon |
| 7,296,970 B2 | 11/2007 | Bannon et al. |
| 7,300,325 B2 | 11/2007 | Mizuguchi et al. |
| 7,306,430 B2 | 12/2007 | Russ |
| 7,347,784 B2 * | 3/2008 | Keller et al. .................. 464/127 |
| 7,410,344 B2 | 8/2008 | Seidel et al. |
| 7,416,392 B2 | 8/2008 | Russ |
| 7,419,357 B2 | 9/2008 | Nohr et al. |
| 7,488,111 B2 | 2/2009 | Chen et al. |
| 7,692,331 B2 | 4/2010 | Langlois et al. |
| 7,708,527 B2 * | 5/2010 | Eccles et al. .............. 416/170 R |
| 2004/0000214 A1 | 1/2004 | Williams |
| 2004/0180726 A1 | 9/2004 | Freeman et al. |
| 2005/0284254 A1 | 12/2005 | Hawkins et al. |
| 2006/0088407 A1 | 4/2006 | Allen et al. |
| 2006/0137355 A1 | 6/2006 | Welch et al. |
| 2007/0066406 A1 | 3/2007 | Keller et al. |
| 2007/0160460 A1 | 7/2007 | Eccles et al. |
| 2007/0267540 A1 | 11/2007 | Atkey et al. |
| 2008/0110151 A1 | 5/2008 | Welch et al. |
| 2009/0026770 A1 | 1/2009 | Huntemann |
| 2009/0045014 A1 | 2/2009 | Delaloye et al. |
| 2009/0121546 A1 | 5/2009 | Langlois et al. |
| 2009/0185931 A1 | 7/2009 | Beagle et al. |
| 2009/0216386 A1 | 8/2009 | Wedel |
| 2010/0158697 A1 | 6/2010 | Russ et al. |
| 2010/0266404 A1 | 10/2010 | Bannon |
| 2010/0270858 A1 | 10/2010 | Foch et al. |

FOREIGN PATENT DOCUMENTS

| | | |
|---|---|---|
| GB | 2402718 A | 12/2004 |
| WO | WO8501326 A1 | 3/1985 |
| WO | WO2007113070 A1 | 10/2007 |
| WO | WO2008045068 A1 | 4/2008 |
| WO | WO2010102967 A2 | 9/2010 |

* cited by examiner

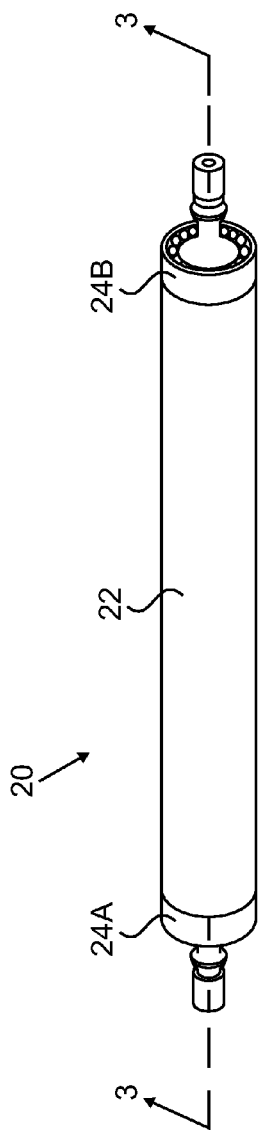
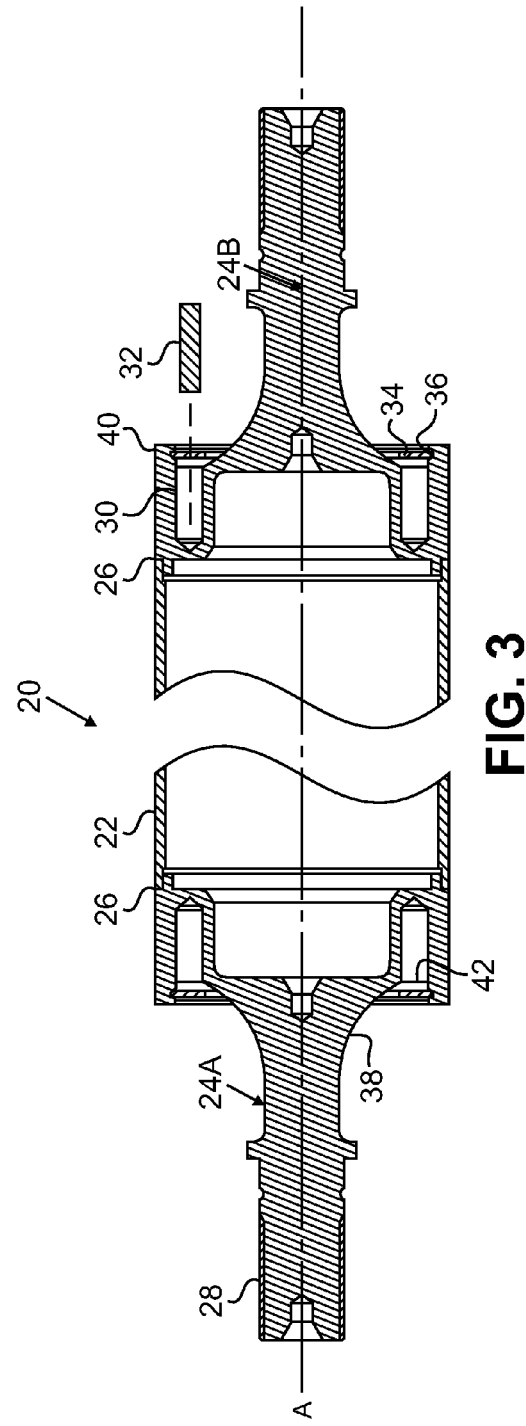

STRUT DRIVESHAFT FOR RAM AIR TURBINE

BACKGROUND

The present invention relates generally to driveshafts and their manufacture, and more particularly to driveshafts for use in struts of a ram air turbines (RATs) and their method of manufacture.

Modern aircraft often include a secondary or emergency power system that can provide power in the event that power is unavailable from a primary power system. RATs are commonly used for secondary or emergency power systems to provide electrical and/or hydraulic power. A typical RAT is deployable in flight by opening suitable doors or hatches in the aircraft's fuselage. The RAT presents a rotatable turbine to oncoming airflow, which rotates the turbine. Rotational energy (torque) from the turbine is then transmitted to a suitable power conversion device (e.g., generator, pump, etc.) that converts that rotational energy to a desired form for use by the aircraft. The RAT may include suitable gearing to adjust the rotational energy to a speed suitable for the power conversion device, as well as other drivetrain components that transmit rotational energy (torque) to desired locations.

Driveshafts used in RAT drivetrains are subject to many requirements. The RAT driveshaft must be reliable, it must be able to mate with necessary drivetrain components and it must be able handle the torque loads to which it will be subjected. Due to the fact that most RATs protrude outward from an aircraft's fuselage in a cantilevered manner, RATs and their subcomponents are subject to a significant amount of vibration and bending. Moreover, the rotational nature of RAT drivetrains can introduce torsional resonance issues. However, because positioning of the RAT in the aircraft must account for numerous other aircraft design factors, the location of the RAT and its subcomponents is highly constrained, which greatly limits design options for the geometry and dimensions of the RAT drivetrain and its driveshafts.

SUMMARY

A driveshaft for an aircraft ram air turbine includes a substantially cylindrical elongate portion, a first end extending from the elongate portion, and a second end extending from the elongate portion opposite the first end. The first and second ends each include a substantially frusto-conical section having a curved generatrix, such that distal portions of each of the first and second ends have smaller outer diameters than an outer diameter of the elongate portion. The elongate portion provides relatively high lateral stiffness and the first and second ends provide relatively low torsional stiffness, such that the driveshaft has a lateral natural frequency higher than an operating range of the driveshaft and has a torsional natural frequency below the operating range of the driveshaft.

BRIEF DESCRIPTION OF THE DRAWINGS

FIG. 2 is a perspective view of a strut driveshaft of the RAT of FIG. 1.

FIG. 3 is a cross-sectional view of the strut driveshaft, taken along line 3-3 of FIG. 2.

Figure 1:
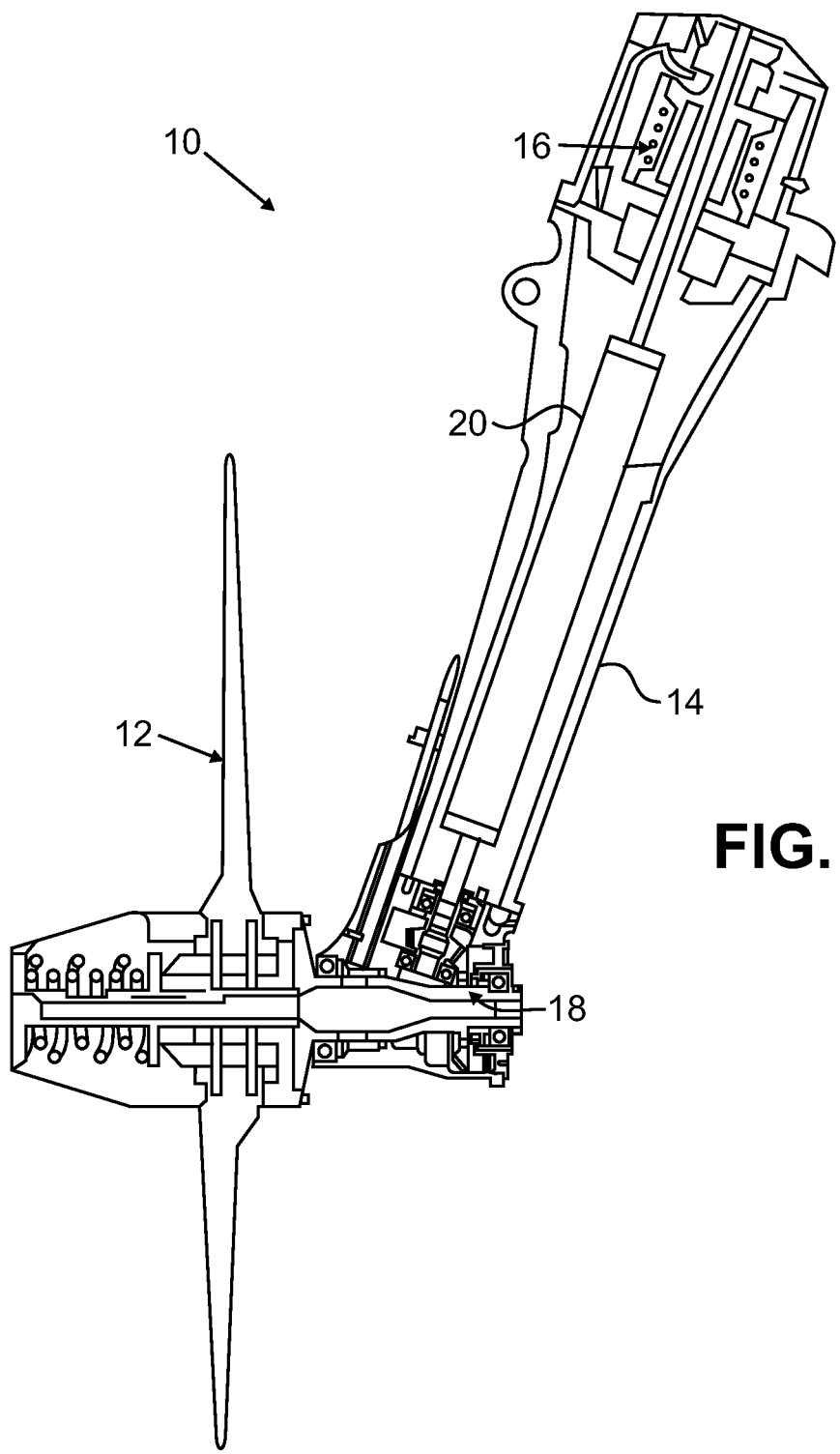
FIG. 1 is a cross-sectional view of a ram air turbine (RAT) according to the present invention.

While the above-identified drawing figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

FIG. 1 is a cross-sectional view of a ram air turbine (RAT) 10 for use with an aircraft (not shown). Cross-hatching is not shown in FIG. 1 for simplicity. The RAT 10 includes a turbine assembly 12, a strut 14, a generator 16, and a drivetrain (or driveline) 18 that includes a strut driveshaft 20. In various embodiments, the turbine assembly 12 can include turbine blades, a hub, a hub locking mechanism, suitable pitch or speed control mechanisms, a gearbox, etc. The strut 14 provides structural support of the RAT 10 and helps support the turbine assembly 12. In the illustrated embodiment, the strut 14 has a hollow and generally cylindrical shape. Moreover, in the illustrated embodiment, the generator 16 is positioned at a proximal end of the strut opposite the turbine assembly 12. It should be noted that the generator 16 is merely one form of power conversion device that can be used with the RAT 10, and is shown merely by way of example and not limitation. For instance, a hydraulic pump can be used in place of or in addition to the generator 16 in further embodiments. The drivetrain 18 includes suitable shafts and gearing to provide a mechanical connection between the turbine assembly 12 and the generator 16, in order to transmit rotational energy (torque) to the generator 16. The strut driveshaft 20 is part of the drivetrain 18, and is positioned at least partially within the strut 14. The strut driveshaft 20 can directly engage the generator 16, and can engage suitable gearing that mates with the turbine assembly 12. In one embodiment, the turbine is configured to have an operating range of approximately 3,800-5,000 RPM (or 63.33-83.33 Hz), with suitable gearing providing a gear ratio to operate the strut driveshaft 20 and the generator 16 at an operating range of approximately 8,000-12,000 RPM (133-200 Hz). Additional details of the strut driveshaft 20 are provided below.

The RAT 10 in the illustrated embodiment is configured to be selectively deployable from fuselage of the aircraft using suitable actuators (not shown). When deployed, the RAT 10 presents the turbine assembly 12 to airflow passing the aircraft, and can be used to generate desired forms of power using kinetic energy from rotation of components of the turbine assembly 12 produced by the passing airflow. The RAT 10 can be deployed in-flight to provide emergency or secondary power. Because the general configuration and use of RATs is well known, further discussion here is unnecessary.

FIG. 2 is a perspective view of the strut driveshaft 20, and FIG. 3 is a cross-sectional view of the strut driveshaft 20, taken along line 3-3 of FIG. 2. A portion of the driveshaft 20 is cut away in FIG. 3 to fit the drawing on the page.

The driveshaft 20 includes an elongate middle portion 22, and two end portions 24A and 24B. The driveshaft 20 can be made from stainless steel, or other suitable materials. In the illustrated embodiment, the driveshaft 20 is substantially symmetrical along an axis of rotation A. The elongate middle portion 22 can be substantially cylindrical. In one embodiment, the elongate middle portion has an outer diameter of approximately 6.99 cm (2.75 inches) with a wall thickness of approximately 2.108 mm (0.083 inches). In the illustrated embodiment, the elongate middle portion 22 is substantially longer in the axial direction than both of the end portions 24A and 24B.

The end portions 24A and 24B can be configured identically to one another, and proximal portions of the end portions 24A and 24B can be joined to opposite ends of the elongate middle portion 22 with butt welded joints 26, which can be formed using electron beam (EB) welding techniques. Attachment features 28, such as splines, are defined at distal portions of the end portions 24A and 24B to permit engagement with other components, such as a drivetrain pinion gear and the generator 16. Each of the end portions 24A and 24B includes a plurality of circumferentially spaced cavities 30 that can be arranged parallel to the axis A. The cavities 30 are configured to accept one or more balancing weights 32 (one of which is shown in FIG. 3 exploded from the driveshaft 20), which can be inserted into appropriate cavities 30 to rotationally balance the strut driveshaft 20 about the axis of rotation A. The balancing weights 32 can be secured to the end portions 24A and 24B with a snap ring 34 configured for engagement with a circumferentially-extending groove 36 defined in the corresponding end portion 24A and 24B adjacent to and radially outward from the cavities 30. Conventional balancing equipment can be used to determine optimal placement of one or more balancing weights 32. The end portions 24A and 24B each include a substantially frusto-conical section 38, at or near the proximal portion, having a curved generatrix (i.e., a curved conical surface) such that the distal portion has a smaller outer diameter than the outer diameter of the elongate portion 22. In some embodiments, the curved generatrix of the substantially frusto-conical section 38 has a compound curvature defined by a plurality of radii. The groove 36 can be formed in a cylindrical portion 40 located radially outward from the substantially frusto-conical section. At least part of the cylindrical portion 40 can axially overhang the substantially frusto-conical portion 38, and at least part of the cylindrical portion 40 positioned adjacent to the cylindrical middle portion 22 and the butt welded joint 26 can have an outer diameter substantially equal to the outer diameter of the cylindrical middle portion 22. In addition, each of the end portions 24A and 24B can include a substantially flat annular surface 42 defined adjacent to and radially outward from the substantially frusto-conical section 38. The cavities 30 can be aligned at the substantially flat annular surface 42.

During operation, the RAT 10 is subject to various forces, including torques, vibration and bending. The strut driveshaft 20, in particular, must be able to transmit suitable torque loads, and must have geometry and size characteristics that allow it to fit within the strut 14 and engage with other components of the RAT 10. For instance, an overall axial length of the strut driveshaft 20 is generally not a free variable in the component's design. Moreover, the size of the attachment features 28 is constrained in the radial direction by components the strut driveshaft 20 must engage. Typical forces on the strut driveshaft 20 during operation include lateral bending (i.e., end-to-end parabolic bending), and torque ripples that pass through the drivetrain 18. Torque ripples can originate from structural movement or bending of the structure of the RAT 10. This in turn forces movement of the strut driveshaft 20 or other components of the drivetrain 18 and can cause increases and decreases in torque transmission over time. This can also cause some displacement (like chatter) at associated gearing interfaces. It is desired to avoid having natural frequencies of the strut driveshaft 20 be in a range of operating frequencies of the RAT 10.

In order to place strut driveshaft natural frequencies (resonance) outside of operating ranges, the strut driveshaft natural frequencies must be either higher or lower than the operating range. However, design limitations preclude some otherwise feasible options. For example, inertia of the generator 16 is relatively large, which means that increasing torsional resonance of the strut driveshaft 20 would make that strut driveshaft 20 impractically large in the radial direction. This leaves only the possibility of lowering the strut driveshaft 20 torsional resonance, but doing so also impacts the lateral natural frequency of the strut driveshaft 20 in a potentially undesirable way. With respect to the lateral natural frequency (or critical speed), that parameter must be above the operating speed range by a sufficient margin (e.g., +/−25%) or there is a risk of shaft failure.

The present invention simultaneously solves these competing challenges in a unique way. The elongate portion 22 of the strut driveshaft 20 provides relatively high lateral stiffness and the end portions 24A and 24B provide relatively low torsional stiffness such that the strut driveshaft 20 has a lateral natural frequency higher than an operating range of the strut driveshaft 22 and has a torsional natural frequency below the operating range of the strut driveshaft 22. In this way, the end portions 24A and 24B, by having the substantially frusto-conical portions 38, are like "weakest spring" portions of the overall strut driveshaft 20 to provide relatively low overall torsional stiffness. At the same time, the relatively short axial lengths of the end portions 24A and 24B (e.g., approximately 10.681 cm (4.205 inches) each) compared to the relatively long axial length of the elongate middle portion 22 (e.g., approximately 60.96 cm (24 inches)) allow the elongate middle portion 22 to provide a relatively large outer diameter over most of the axial length of the strut driveshaft 20, thereby providing relatively high overall lateral stiffness.

In various embodiments relationships of features of the strut driveshaft 20 can have the following relationships. The outer diameter of the middle portion 20 can be in the range of 3.77 to 3.88 times the outer diameter at the distal portions of the end portions 24A and 24B. The length of the middle portion 20 can be in the range of 5.67-5.75 times the length of each end portion 24A or 24B.

Any relative terms or terms of degree that used herein, such as "substantially", "approximately", "about", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A driveshaft for an aircraft ram air turbine, the driveshaft comprising:
   an elongate portion, wherein the elongate portion is substantially cylindrical;
   a first end extending from the elongate portion; and
   a second end extending from the elongate portion opposite the first end, wherein the first and second ends each include a substantially frusto-conical section having a curved generatrix such that distal portions of each of the first and second ends have smaller outer diameters than an outer diameter of the elongate portion;

wherein the first and second ends are mechanically connected to a driveline that extends between a power conversion device and a turbine;

wherein at least one of the first and second ends further comprises:

a cylindrical portion located radially outward from the substantially frusto-conical section, wherein at least part of the cylindrical portion axially overhangs the substantially frusto-conical portion such that the cylindrical portion is separated from the distal portion of the corresponding first or second end by a radial gap, wherein the elongate portion provides higher lateral stiffness than the first and second ends, and wherein the first and second ends provide lower torsional stiffness than the elongate portion, such that the driveshaft has an overall lateral natural frequency higher than an operating range of the driveshaft and has an overall torsional natural frequency below the operating range of the driveshaft.

2. The driveshaft of claim 1, wherein the operating range of the driveshaft is approximately 8,000-12,000 RPM (133-200 Hz).

3. The driveshaft of claim 1, wherein the elongate portion is secured to each of the first and second ends with an electron beam welded butt joint.

4. The driveshaft of claim 1 and further comprising:
splines formed at the distal portions of each of the first and second ends.

5. The driveshaft of claim 1, wherein at least one of the first and second ends further comprises:
a plurality of circumferentially spaced cavities configured to accept one or more balancing weights.

6. The driveshaft of claim 5 and further comprising:
a snap ring configured for engagement with a circumferentially-extending groove defined adjacent to the plurality of circumferentially spaced cavities in the at least one of the first and second ends, the circumferentially-extending groove being open in an inwardly facing direction.

7. The driveshaft of claim 6, wherein the circumferentially-extending groove is located radially outward from the plurality of circumferentially spaced cavities.

8. The driveshaft of claim 1, wherein the elongate portion is 5.67-5.75 times longer than each of the first and second ends.

9. The driveshaft of claim 1, wherein the first and second ends have identical configurations such that the driveshaft is symmetrically shaped.

10. The driveshaft of claim 1, wherein at least one of the first and second ends further comprises:
a substantially flat annular surface defined adjacent to and radially outward from the substantially frusto-conical section.

11. The driveshaft of claim 10, wherein the at least one of the first and second ends further comprises:
a plurality of circumferentially spaced cavities located along the substantially flat annular surface and configured to accept one or more balancing weights.

12. The driveshaft of claim 1, wherein the curved generatrix of the substantially frusto-conical section has a compound curvature defined by a plurality of radii.

13. The driveshaft of claim 1, wherein an outer diameter of the elongate portion is in the range of 3.77 to 3.88 times an outer diameter at the distal portion of each of the first and second ends.

14. The driveshaft of claim 1, wherein the elongate portion is 5.67-5.75 times longer than each of the first and second ends, and wherein an outer diameter of the elongate portion is in the range of 3.77 to 3.88 times an outer diameter at the distal portion of each of the first and second ends.

15. A ram air turbine for use with an aircraft, the ram air turbine comprising:

a power conversion device;

a turbine assembly;

a driveshaft mechanically connected to a driveline that extends between the power conversion device and the turbine, the driveshaft comprising:

a middle portion, wherein the middle portion is substantially cylindrical;

a first end extending from the middle portion;

a second end extending from the middle portion opposite the first end, wherein the first and second ends have the same shape, wherein the first and second ends each include a substantially frusto-conical section having a curved conical surface and are configured such that distal portions the first and second ends each have smaller outer diameters than an outer diameter of the middle portion, and wherein each of the first and second ends defines a plurality of circumferentially spaced cavities configured to accept one or more balancing weights; and mating features formed at the distal portions of each of the first and second ends, wherein a diameter of the middle portion of the drive shaft is sufficiently larger than the distal portions of each of the first and second ends to provide higher lateral stiffness than the first and second ends while the first and second ends of the driveshaft provide lower torsional stiffness than the middle portion such that the driveshaft has an overall lateral natural frequency higher than an operating range of the driveshaft and has an overall torsional natural frequency below the operating range of the driveshaft, wherein the middle portion of the driveshaft is 5.67-5.75 times longer than each of the first and second ends, and wherein an outer diameter of the middle portion is in the range of 3.77 to 3.88 times an outer diameter at the distal portion of each of the first and second ends.

16. The ram air turbine of claim 15, wherein the operating range of the driveshaft is approximately 8,000-12,000 RPM (133-200 Hz).

17. The ram air turbine of claim 15, wherein the middle portion is secured to each of the first and second ends with an electron beam welded butt joint.

18. The ram air turbine of claim 15, wherein at least one of the first and second ends of the driveshaft further comprises:

a substantially flat annular surface defined adjacent to and radially outward from the substantially frusto-conical section;

a plurality of circumferentially spaced cavities located along the substantially flat annular surface and configured to accept one or more balancing weights; and a snap ring configured for engagement with a circumferentially-extending groove defined adjacent to the plurality of circumferentially spaced cavities in the at least one of the first and second ends, wherein the circumferentially-extending groove is located radially outward from the plurality of circumferentially spaced cavities.

19. The ram air turbine of claim 15, wherein at least one of the first and second ends of the driveshaft further comprises:
a cylindrical portion located radially outward from the substantially frusto-conical section, wherein at least part of the cylindrical portion axially overhangs the substantially frusto-conical portion such that the cylindrical portion is separated from the distal portion of the corresponding first or second end by a radial gap.

20. A method of making a driveshaft for a ram air turbine, the method comprising:
providing a cylindrical member having a diameter;
providing a pair of end pieces that each have a curved taper such that distal portions of the end pieces have a smaller diameter than the cylindrical member, such that the driveshaft has an overall lateral natural frequency higher than an operating range of the driveshaft and has an overall torsional natural frequency below the operating range of the driveshaft, and such that an outer diameter of the cylindrical member is in the range of 3.77 to 3.88 times an outer diameter at the distal portion of each of the end pieces;
welding the pair of end pieces to opposite ends of the cylindrical member using electron beam welding; and
operatively engaging the pair of end pieces in a driveline that extends between a power conversion device and a turbine.

21. A method of installing a driveshaft in a ram air turbine, the method comprising:
providing a driveshaft having a substantially cylindrical middle portion, a first end extending from the middle portion, a second end extending from the middle portion opposite the first end, wherein the first and second ends have the same shape, wherein the first and second ends each include a substantially frusto-conical section having a curved conical surface and are configured such that distal portions the first and second ends each have smaller outer diameters than an outer diameter of the middle portion, and wherein each of the first and second ends defines a plurality of circumferentially spaced cavities configured to accept one or more balancing weights, and mating features formed at the distal portions of each of the first and second ends, wherein the first and second ends of the driveshaft provide lower torsional stiffness than the middle portion such that the driveshaft has an overall torsional natural frequency determined by the torsional stiffness of the first and second ends that is below the operating range of the driveshaft, and wherein the first and second ends each further include a cylindrical portion located radially outward from the substantially frusto-conical section with at least part of the cylindrical portion axially overhanging the substantially frusto-conical portion such that the cylindrical portion is separated from the distal portion of the corresponding first or second end by a radial gap to tailor the torsional stiffness;
positioning the driveshaft at least partially within a strut; and
operatively engaging the driveshaft in a driveline that extends between a turbine and a power conversion device.

\* \* \* \* \*